April 21, 1953   J. F. RAMPE   2,635,473
UNIVERSAL PORTABLE TUMBLING MACHINE AND DRIVE THEREFOR
Filed Dec. 20, 1950   2 SHEETS—SHEET 1
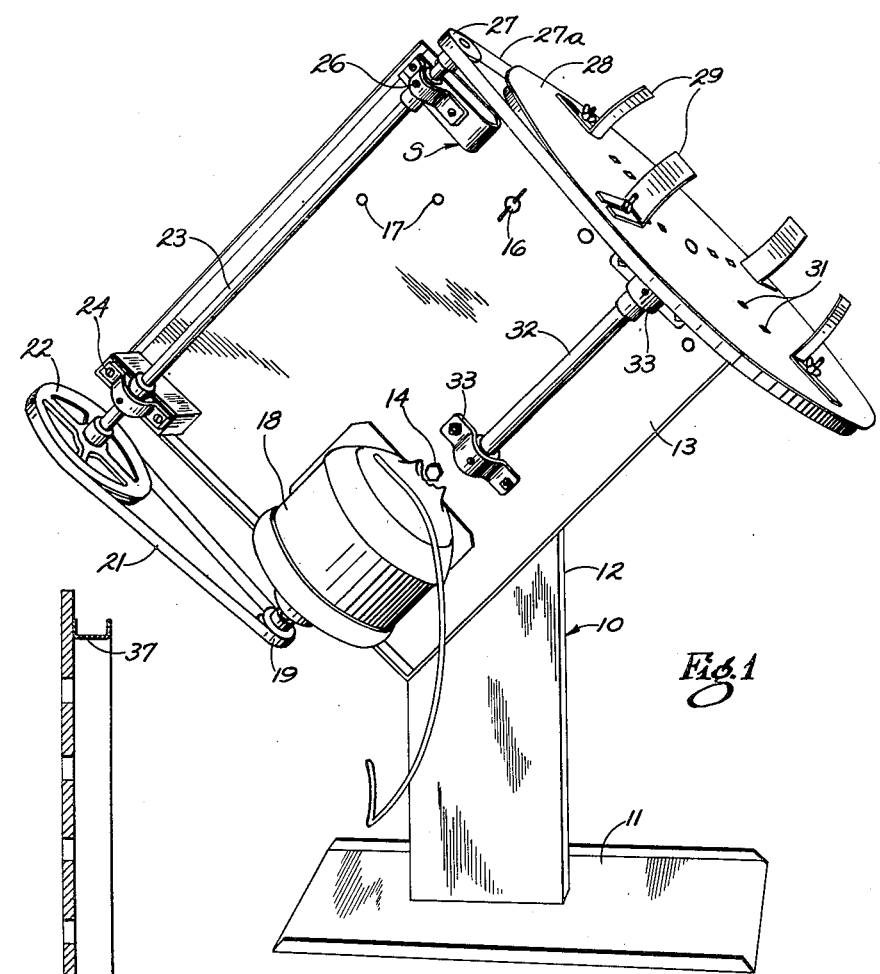
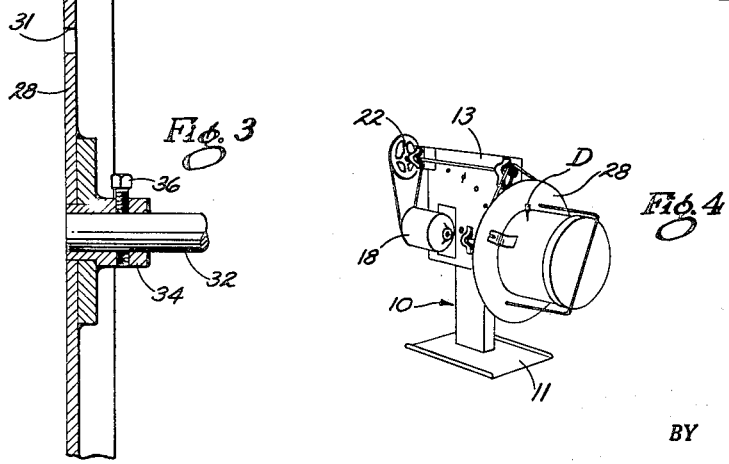
INVENTOR.
JOHN F. RAMPE
BY Richey & Watts
ATTORNEYS

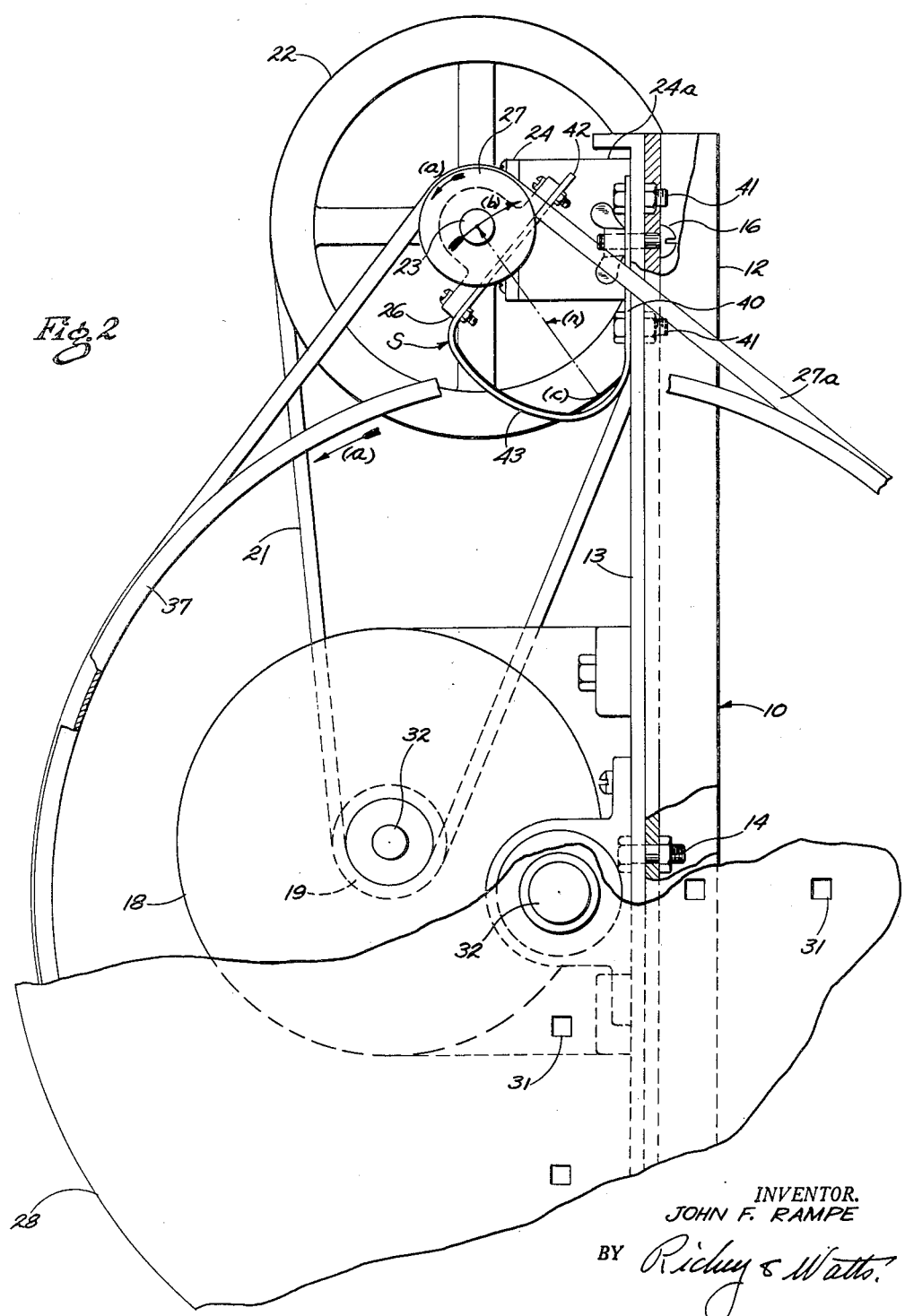

Patented Apr. 21, 1953

2,635,473

UNITED STATES PATENT OFFICE 2,635,473

UNIVERSAL PORTABLE TUMBLING MACHINE AND DRIVE THEREFOR

John F. Rampe, Cleveland Heights, Ohio

Application December 20, 1950, Serial No. 201,710

4 Claims. (Cl. 74—219)

This invention relates to tumbling or mixing machines, and more particularly to such machines specifically adapted to be of a lightweight, portable, and inexpensive yet dependable construction.

Tumbling machines have been conventionally fabricated in a heavy rigid manner employing gear drives and requiring powerful motors to handle the changing load characteristics imparted to the drive by the nature of the tumbling and mixing processes. There has been a long-felt need in the trade for an inexpensive, lightweight, tumbling and mixing machine that is portable, universal in its application, has a long service life, and is inexpensive to manufacture. The heavily-constructed, high-powered machines previously available to the trade have not met this need, and to my knowledge no one has successfully presented to the trade a lightweight, inexpensive machine which would hold up under hard service and did not require a heavy-duty motor.

Difficulties with prior machines resided in the rigidity of the driving mechanism as well as in the weight thereof. In accordance with my invention I am able to produce a tumbling machine which will handle fifty pounds of small parts or will mix up to five gallons of paint at a time, and yet the over-all weight of the apparatus is only eighty pounds, and a one-sixth horsepower motor provides adequate power to drive the machine. Yet, this device stands up well in service and can be sold very economically.

I have found that the limiting factor in prior tumbling machines is the arrangement of the parts and particularly of the driving gears. Due to the shock loads imparted on the gearing and the motor by the nature of the tumbling process, the gears had to be excessively heavy and the motors excessively powerful. I have devised a V-belt drive for the tumbling support disc which has the inherent resilient qualities of the V-belt drive, and in addition I have provided a shock-absorbing and self-tightening mounting for the final drive pulley which automatically tightens the belt in response to load increases, and does so in a manner that slipping is entirely eliminated, thereby maintaining the superior power transmission characteristics of a static friction device as opposed to the characteristics of a dynamic friction device represented by a drive pulley slipping on its V-belt.

In the preferred embodiment of the invention, a V-belt-driven jack shaft is pivotally mounted at one end and is mounted on a novel C-shaped leaf spring on the other end, that is, the end adjacent the driving pulley for the main tumbling support disc. The spring is so arranged that as the load increases, for example, the drive pulley rotates about an instantaneous center so disposed that there is a tendency of the drive pulley to crawl along the belt and simultaneously tighten the belt which gives a resilient shock-absorbing, self-tightening action on the drive. Due to this action, particularly the shock-absorbing nature thereof, the motor is not overloaded by sudden surges, and accordingly a motor of smaller power can be employed than has been heretofore found feasible.

The manner in which these and other objects and advantages may be accomplished will be apparent from the following detailed description of a preferred embodiment of the invention.

In the drawings:

Fig. 1 is a perspective view of a machine made in accordance with the invention;

Fig. 2 is an end view with parts broken away to show the shock-absorbing, self-tightening drive;

Fig. 3 shows a detail of the tumbler supporting disc; and

Fig. 4 illustrates how the apparatus may be adjusted to different positions.

The basic parts of the mechanism can all be seen in Fig. 1, and include a stand indicated generally at 10 comprising a base plate 11 and a channel-shaped upright 12. A base plate 13 which mounts the driving apparatus is pivotally mounted on the upright 12 by means of a bolt 14 through the plate and the upright, this bolt appearing most clearly in Fig. 2. In order to secure the plate 13 in a selected position, a wing nut assembly 16 extends through an aperture in the upright and may be secured in any one of an arcuate array of apertures 17, thereby providing the desired angular adjustment of the apparatus. Bolted to the base plate 13 is a drive motor 18 and a V-belt pulley 19 mounted on its shaft around which the V-belt 21 passes and thereby drives a large V-belt pulley 22 mounted on the end of a jack shaft 23.

The jack shaft is mounted on the base plate by means of a universal which may be a bearing of the self-aligning type indicated at swivel bearing 24 and a second bearing 26 mounted on the base plate by means of a spring member S, details of which will be explained presently. A small drive pulley 27 is fixed to the other end of the jack shaft, and by means of a second V-belt 27a drives a tumbler support disc 28. The tumbler support disc may have container-locating brackets 29 adjustably mounted in spaced holes 31 in the disc, and the disc 28 is mounted for rotation on the base plate 13 by means of a shaft 32 and spaced bearings 33.

As seen in Fig. 3, the base plate 28 is fabricated with a hub member 34 which mounts on the shaft 32 by means of a set screw 36. Welded to the disc 28 is a ring member 37 which serves as a large diameter pulley for the V-belt 27a.

The construction and operation of the resilient, self-tightening drive may be best seen in Fig. 2. Here it can be seen that the spring S is a generally C-shaped leaf spring member having one straight leg 40 bolted to the base plate 13 by means of bolts or screws 41 and another straight leg 42 that extends freely from a curved or arcuate section 43 integral with both legs. Free leg 42 mounts the bearing 26 for the associated end of the jack shaft 23.

In operation, such as when the machine is employed as a tumbler for example, the rotational resistance of the disc 28 varies as the parts within a container (such as drum D shown in Fig. 4) shift and tumble upon one another. For example, as the shifting of the parts tends to increase the load on the driving belts and motor, this increase is resiliently accommodated by the driving mechanism without slipping. For example, as seen in Fig. 2, with the arrangement of spring S there illustrated the motor will be arranged to drive the pulley 27 and disc 28 in a direction indicated by the small arrows a. Thus, due to the frictional reaction between the pulley and the belt, the pulley 27 tends to crawl along the belt in such a direction as to tend to cause the free end of the jack shaft to move generally to the right, as viewed in Fig. 2.

The spring S is so proportioned and mounted that any motion of the free arm 42, and hence the jack shaft 23 mounted thereon, in response to increased loads occurs, about an instantaneous center c located to the right (in the drawings) of a line connecting the centers of shafts 23 and 32. In other words the shaft 23 tends to move in an arc indicated by the arrow b about a radius r. The spring S is proportioned so that the legs are brought together somewhat to provide an initial tension on the V-belt. The natural tendency of the jack shaft 23 to move in the direction indicated by the arrow b is such that the crawl of the pulley 27 along the belt due to increased loads tends to increase the center-to-center distance between the shafts and, hence, resiliently tighten the belt. This action is instantaneous and automatic and begins as soon as there is the slightest increase in the load, and slipping of the belt is never allowed to begin. This is an important feature because if slipping were permitted there would be a changeover from static to moving friction, and the slipping would be accentuated, rapidly destroying the belt 27a. The aforesaid action of spring S, in addition to being a self-tightening, slip-preventing one, is a shock-absorbing, resilient action that is very sensitive to load variations of the tumbler and provides a certain amount of motion of the free end of shaft 23 in the general direction of the arrow b under increase of loads, so that instead of instantaneous transmitting the load increases to the motor. There is a lag due to the shaft travel and the load increase is sensed at the motor as a steady gradual increase. Thus, the motor is not subject to sudden increases in current flow through the armature so that a high overload factor need not be provided, and a smaller motor employed, than has heretofore been possible in such apparatus.

As was mentioned previously, I have found that a tumbling support disc 28 of approximately twenty inches in diameter may be driven in the manner shown by a one-sixth horsepower motor and will handle up to fifty pounds of material for tumbling or mixing. It is believed that it is an important feature of the invention that the periphery of the driving pulley 27 be relatively close to the periphery of the large pulley or ring-like member 37 so that the crawling action of the pulley 27 along the belt 27a may be obtained without requiring that the pulley 27 move toward the disc 28 as it would if the centers of the shafts were spaced a distance appreciably greater than that shown. For example, in the size machine illustrated, the large pulley 37 is approximately seventeen inches in diameter, the small pulley 27 two inches in diameter, and the center-to-center distance between the shafts is approximately fifteen inches.

Fig. 4 illustrates the versatility of the apparatus which is there employed for mixing paint in a container C.

I am aware that self-tightening, V-belt drives have been proposed before, but to my knowledge none have been so organized with relation to the problems in the tumbler art so as to teach the over-all arrangement of the parts that made possible a successful, practical, lightweight, and economical portable tumbling and mixing apparatus.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. In a tumbler or the like, a base plate, a motor on said plate having a pulley, a container support disc of relatively large diameter rotatably mounted on said plate, a large diameter V-belt pulley on said disc, a jack shaft, a small pulley on one end of said shaft in the plane of said large diameter pulley, a pulley wheel on the other end of said shaft in the plane of said motor pulley, means mounting said jack shaft on said plate with its axis generally parallel to that of said disc, a V-belt around each pair of co-planar pulleys, said jack-shaft mounting means comprising a swivel universal bearing adjacent said pulley wheel and a spring mounted bearing adjacent said small pulley arranged to tighten the associated belt.

2. In a tumbler or the like, a base plate, a motor on said plate, a container support disc of relatively large diameter rotatably mounted on said plate, a large diameter V-belt pulley on said disc, a jack shaft, a small pulley on one end of said shaft in the plane of said large diameter pulley, reduction drive means between said motor and the other end of said shaft, means mounting said jack shaft on said plate with its axis generally parallel to that of said disc, a V-belt around said pulleys, said jack shaft mounting means comprising a swivel universal bearing for said shaft remote from said small pulley, a generally C-shaped leaf spring having two generally straight legs joined by a curved section, one of said legs being mounted on said plate and extending generally radially outwardly from said curved section the other of said legs being free, and a jack shaft bearing mounted on the other of said legs.

3. In a tumbler or the like, a base plate, a motor on said plate, a container support disc of relatively large diameter rotatably mounted on said plate, a large diameter V-belt pulley on said disc, a jack shaft, a small pulley on one end of said shaft in the plane of said large diameter pulley, reduction drive means between said motor and the other end of said shaft, means mounting said jack shaft on said plate with its axis generally parallel to that of said disc, a V-belt around said pulleys, said mounting means comprising a swivel universal bearing for said shaft remote from said small pulley, a generally C-shaped leaf spring having two generally straight legs joined by a curved section, one of said legs being mounted on said plate and extending generally radially outwardly from said curved section the other of said legs being free, and a jack shaft bearing mounted on the other of said legs, said spring being formed so that flexing thereof due to the driving force of said small pulley is about an instantaneous center displaced from the plane of said shaft and disc axes in a direction toward the leg mounted on said plate.

4. A self-adjusting drive assembly comprising a base, a driven disc member, a large diameter V-belt pulley rotatably mounted on said disc member, a jack shaft, a small pulley on one end of said jack shaft in the plane of said large diameter pulley, means for driving the other end of said jack shaft, means mounting said jack shaft on said plate with its axis generally parallel to that of said large pulley, a V-belt around said pulleys, said jack shaft mounting means comprising a universal bearing for said shaft mounted on said base remote from said small pulley, a generally C-shaped leaf spring having two generally straight legs joined by a curved section, one of said legs being mounted on said base and extending generally radially outwardly from said curved section, the other of said legs being free, and a jack shaft bearing mounted on said free leg, said spring being formed so that flexing thereof due to the driving force of said small pulley is about an instantaneous center displaced from the plane of said shaft and large pulley axes in a direction toward the leg that is mounted on said plate.

JOHN F. RAMPE.

References Cited in the file of this patent
UNITED STATES PATENTS

| Number | Name | Date |
|---|---|---|
| 341,631 | Baird | May 11, 1886 |
| 1,611,795 | Warner | Dec. 21, 1926 |
| 2,257,758 | Murch | Oct. 7, 1941 |
| 2,368,848 | Krueger | Feb. 6, 1945 |
| 2,419,392 | Doniak | Apr. 22, 1947 |